US009752060B2

(12) United States Patent
Qiu et al.

(10) Patent No.: US 9,752,060 B2
(45) Date of Patent: Sep. 5, 2017

(54) FLUOROALKYL SILICONE COMPOSITIONS

(71) Applicant: 3M INNOVATIVE PROPERTIES COMPANY, St. Paul, MN (US)

(72) Inventors: Zai-Ming Qiu, Woodbury, MN (US); Jitendra S. Rathore, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 15/023,737

(22) PCT Filed: Oct. 1, 2014

(86) PCT No.: PCT/US2014/058529
§ 371 (c)(1),
(2) Date: Mar. 22, 2016

(87) PCT Pub. No.: WO2015/050928
PCT Pub. Date: Apr. 9, 2015

(65) Prior Publication Data
US 2016/0230050 A1    Aug. 11, 2016

Related U.S. Application Data

(60) Provisional application No. 61/886,829, filed on Oct. 4, 2013.

(51) Int. Cl.
C08G 77/08 (2006.01)
C09J 7/02 (2006.01)
C08G 77/385 (2006.01)
C09D 183/08 (2006.01)
C08G 77/12 (2006.01)
C08G 77/18 (2006.01)

(52) U.S. Cl.
CPC .......... *C09J 7/0228* (2013.01); *C08G 77/385* (2013.01); *C09D 183/08* (2013.01); *C08G 77/12* (2013.01); *C08G 77/18* (2013.01); *C09J 2427/005* (2013.01); *C09J 2433/00* (2013.01); *C09J 2483/00* (2013.01); *C09J 2483/005* (2013.01)

(58) Field of Classification Search
CPC ....... C08G 77/385; C08G 77/18; C08G 77/12
See application file for complete search history.

(56) References Cited

U.S. PATENT DOCUMENTS

| 3,159,662 A | 12/1964 | Ashby |
| 3,178,464 A | 4/1965 | Pierpoint |
| 3,220,972 A | 11/1965 | Lamoreaux |
| 3,313,773 A | 4/1967 | Lamoreaux |
| 3,410,886 A | 11/1968 | Joy |
| 3,470,225 A | 9/1969 | Knorre |
| 3,484,470 A | 12/1969 | Pittman |
| 3,567,755 A | 3/1971 | Coigne |
| 3,715,334 A | 2/1973 | Karstedt |
| 3,775,452 A | 11/1973 | Karstedt |
| 3,814,730 A | 6/1974 | Karstedt |
| 3,814,731 A | 6/1974 | Nitzche |
| 4,276,252 A | 6/1981 | Kreis |
| 4,288,345 A | 9/1981 | Ashby |
| 4,510,094 A | 4/1985 | Drahnak |
| 4,530,879 A | 7/1985 | Drahnak |

(Continued)

FOREIGN PATENT DOCUMENTS

CN  102585232  7/2012
EP  0238033  9/1987
(Continued)

OTHER PUBLICATIONS

Nakajima et al., "Hydrosilylation reaction of olefins: recent advances and perspectives", RSC Adv., 2015, 5:20603-20616. Published online Feb. 12, 2015, retrieved on Mar. 21, 2017.

Stein et al., "In Situ Determination of the Active Catalyst in Hydrosilylation Reactions Using Highly Reactive Pt(0) Catalyst Precursors", J. Am. Chem. Soc., 1999, 121:3693-3703. Published online Mar. 31, 1999.

Furukawa "Reactivity of Cyclosiloxane With 3,3,4,4,5,5,6,6,6-Nonafluorohexyl Group and Its Application to Fluorosilicone Synthesis", Journal of Applied Polymer Science, Dec. 20, 2001, vol. 82, No. 13, pp. 3333-3340.

Furukawa, "Synthesis and Properties of Fluorosilicone With Perfluorooctylundecyl Side Chains", Journal of Polymer Science Part A: Polymer Chemistry, Sep. 1, 2003, vol. 41, No. 17, pp. 2704-2714.

Kobayashi, "Surface Tension of Poly (3,3,4,4,5,5,6,6,6-nonafluorohexyl)-Methylsiloxane]", Macromolecules, 1990, vol. 23, pp. 4929-4933.

(Continued)

*Primary Examiner* — Margaret Moore
(74) *Attorney, Agent, or Firm* — Kent S. Kokko

(57) ABSTRACT

Provided is fluoroalkyl silicone of the formula (I): wherein each $R^1$ is independently an alkyl or aryl; $R_f$ is a perfluoroalkyl group, optionally substituted by one or more in-chain —O—, .S— or —$NR_f^1$— heteroatoms, where $R_f^1$ is a perfluoroalkyl preferably a $C_1$-$C_6$ perfluoroalkyl; $R^3$ is —H, —$OR^4$; where $R^4$ is a $C_1$-$C_4$ alkyl n is 0 to 2000; m may be zero; p may be zero, n+m+p is at least one; q is at least 3; $R^5$ is H, alkyl, aryl-$(CH_2)_n$— $CF_2CHF$—O—$R_f$; or $R_3$; wherein the fluoroalkyl silicone has at least one fluorinated group of the formula $(CH_2)_q$—O—$CF_2CHF$—O—$R_f$.

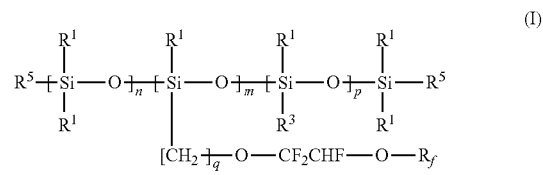

21 Claims, No Drawings

(56) References Cited

U.S. PATENT DOCUMENTS

| | | |
|---|---|---|
| 4,603,215 A | 7/1986 | Chandra |
| 4,640,939 A | 2/1987 | Cavezzan |
| 4,670,531 A | 6/1987 | Eckberg |
| 4,699,813 A | 10/1987 | Cavezzan |
| 4,705,765 A | 11/1987 | Lewis |
| 4,712,092 A | 12/1987 | Boldridge, Jr. |
| 4,916,169 A | 4/1990 | Boardman |
| 5,082,706 A | 1/1992 | Tangney |
| 5,126,394 A | 6/1992 | Revis |
| 5,274,159 A | 12/1993 | Pellerite |
| 5,286,815 A | 2/1994 | Leir |
| 5,317,073 A | 5/1994 | Evans |
| 5,356,719 A * | 10/1994 | Hamada ............... C08L 83/08 428/447 |
| 5,578,381 A | 11/1996 | Hamada |
| 5,639,845 A | 6/1997 | Inomata |
| 5,648,407 A | 7/1997 | Goetz |
| 5,677,050 A | 10/1997 | Bilkadi |
| 5,688,884 A | 11/1997 | Baker |
| 6,129,980 A | 10/2000 | Tsukada |
| 6,255,536 B1 | 7/2001 | Worm |
| 6,299,799 B1 | 10/2001 | Craig |
| 6,329,058 B1 | 12/2001 | Arney |
| 6,353,037 B1 | 3/2002 | Thunhorst |
| 6,376,569 B1 | 4/2002 | Oxman |
| 6,462,100 B1 | 10/2002 | Thunhorst |
| 6,479,610 B1 | 11/2002 | Singh |
| 6,482,979 B1 | 11/2002 | Hintzer |
| 6,646,088 B2 | 11/2003 | Fan |
| 6,753,360 B2 | 6/2004 | Mielewski |
| 6,803,109 B2 | 10/2004 | Qiu |
| 7,056,846 B2 | 6/2006 | Clark |
| 7,199,197 B2 | 4/2007 | Caldwell |
| 7,279,210 B2 | 10/2007 | Hulteen |
| 7,407,710 B2 | 8/2008 | Qiu |
| 7,410,704 B2 | 8/2008 | Qiu |
| 7,413,807 B2 | 8/2008 | Qiu |
| 7,893,186 B2 | 2/2011 | Yang |
| 2005/0113609 A1 * | 5/2005 | Furukawa ............... C07C 43/17 568/685 |
| 2011/0020657 A1 | 1/2011 | Chang |
| 2012/0157703 A1 | 6/2012 | Marciniec |
| 2012/0219794 A1 | 8/2012 | Seth |

FOREIGN PATENT DOCUMENTS

| | | |
|---|---|---|
| EP | 1 535 892 | 6/2005 |
| GB | 2443626 | 5/2008 |
| JP | 1-226844 | 9/1989 |
| WO | WO 98-40439 | 9/1998 |
| WO | WO 2006-007917 | 1/2006 |
| WO | WO 2010-144352 | 12/2010 |
| WO | WO 2014-099497 | 6/2014 |
| WO | WO 2015-050740 | 4/2015 |

OTHER PUBLICATIONS

International Search Report for PCT International Applicaion No. PCT/US2014/058529 mailed on Dec. 12, 2014, 3 pages.
Yi, et al., "Preparation and Application of Fluorosilione Polymer," Polymer Bulletin, No. 7, pp. 77-81.

* cited by examiner

FLUOROALKYL SILICONE COMPOSITIONS

CROSS REFERENCE TO RELATED APPLICATIONS

This application is a national stage filing under 35 U.S.C. 371 of PCT/US2014/058529, filed Oct. 1, 2014, which claims the benefit of U.S. Application No. 61/886,829, filed Oct. 4, 2013, the disclosure of which is incorporated by reference in its/their entirety herein.

BACKGROUND

Pressure sensitive adhesives (PSAs) are an important class of materials. Generally, PSAs adhere to a substrate with light pressure (e.g., finger pressure) and typically do not require any post-curing (e.g., heat or radiation) to achieve their maximum bond strength. A wide variety of PSA chemistries are available. PSAs, particularly silicone PSAs offer one or more of the following useful characteristics: adhesion to low surface energy (LSE) surfaces, quick adhesion with short dwell times, wide use temperature (i.e., performance at high and low temperature extremes), moisture resistance, weathering resistance (including resistance to ultraviolet (UV) radiation, oxidation, and humidity), reduced sensitivity to stress variations (e.g., mode, frequency and angle of applied stresses), gentleness to skin, and resistance to chemicals (e.g., solvents and plasticizers) and biological substances (e.g., mold and fungi).

Fluorinated release coatings are often used with PSAs, particularly silicone PSAs, to provide desired release properties. In some embodiments, the desired release force is no greater than 50 g/25 mm, e.g., no greater than 30 g/25 mm at 180 degrees peel angle and 230 cm/min (90 inches/min). However, the selection of fluorinated release coatings available to achieve the desired release performance is limited, particularly for wet-cast (e.g., solvent-based, water-based, and hot melt coated) PSAs. For example, few release materials provide stable, consistent, smooth release of an adhesive.

The most common fluorinated release coatings are fluorosilicone materials with pendent $R_fCH_2CH_2$— group made from $R_f$—CH=CH$_2$, wherein $R_f$ is typically a CF$_3$— or a $CF_3CF_2CF_2CF_2$— group. However, commercially available fluorosilicone release coatings are typically more expensive, The reasons for high cost of commonly used fluorosilicone release materials are believed to related a) the lower reactivity of $R_fCH$=CH$_2$ to low yield hydrosilylation reactions, and b) the preparation from expensive $R_f$—I with two steps, i) addition to ethylene to form $R_fCH_2CH_2$—I and ii) elimination of HI.

The present disclosure provides novel fluoroalkyl silicones that can be used as release materials or can also be blended with one or more additional low surface energy materials (e.g., fluoropolymers, polyacrylate with pendent $R_f$ group, lower cost fluoroalkyl silicones and non-fluorinated silicones) while maintaining the desired low release characteristics of the instant fluorosilicone material. In addition, in some embodiments, high blend ratios of low surface energy materials may be used without detrimentally affecting the re-adhesion force of the adhesive after removal of the blended release materials comprising the present fluorosilicones.

Applicants have identified high reactive fluorinated alkenes for high yield of hydrosilylation products (from hydrosilicones) and subsequently providing novel fluoroalkyl silicones having similar or better performance to current products at reduced cost.

SUMMARY

The present disclosure relates to novel fluoroalkyl silicones and use thereof as release materials. In another aspect, the present disclosure provides release liners comprising a substrate and the release material according to the present disclosure bonded to a major surface of the substrate. In another aspect, the present disclosure providers a crosslinked or uncrosslinked coating comprising the fluoroalkyl silicone release material.

In yet another aspect, the present disclosure provides adhesive articles comprising an adhesive having a first major surface and a second major surface, wherein the first major surface of the adhesive is in contact with a release material according to the present disclosure. In some embodiments, the adhesive articles further comprise a first substrate (or backing) having a first major surface and a second major surface, wherein the release material is bonded to the first major surface of the first substrate. In some embodiments, the second major surface of the adhesive is in contact with the second major surface of the first substrate. In some embodiments, the second major surface of the adhesive is in contact with a second, independently selected release material bonded to the second major surface of the first substrate. In some embodiments, the adhesive articles further comprise a second substrate, wherein the second major surface of the adhesive is in contact with a major surface of the second substrate.

In some embodiments, the adhesive comprises a silicone adhesive. In some embodiments, the silicone adhesive comprises a poly(diorganosiloxane). In some embodiments, the silicone adhesive comprises a polydiorganosiloxane-polyurea block copolymer. In some embodiments, the silicone adhesive comprises a polydiorganosiloxane-polyoxamide copolymer. In some embodiments, the silicone adhesive further comprises a tackifier. In other embodiments, the adhesive comprises an acrylate adhesive.

In another aspect the present disclosure provides a method of making the fluoroalkyl silicones by the hydrosilylation reaction between a perfluoroalkyl alkenyl ether and a hydrosilicone.

DETAILED DESCRIPTION

The present disclosure provides novel fluoroalkyl silicones of the formula:

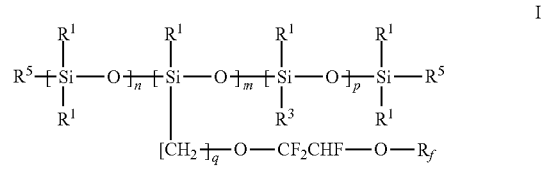

wherein
each $R^1$ independently an alkyl or aryl;
$R_f$ is a perfluoroalkyl group, optionally substituted by one or more in-chain —O—, —S— or —NR$_f^1$-heteroatoms, where $R_f^1$ is a perfluoroalkyl, preferably a $C_1$-$C_6$ perfluoroalkyl;
$R^3$ is —H, —OR$^4$; where R$^4$ is a $C_1$-$C_4$alkyl
n is 0 to 2000;

m may be zero, preferably al least 2;
p may be zero, preferably 10 to 2000;
n+m+p is at least one;
q is at least 3;
$R^5$ is H, alkyl, aryl, —$(CH_2)_n$—O—$CF_2CHF$—O—$R_f$, or $R^3$;
wherein the fluoroalkyl silicone has at least one $R_f$ group of the formula —$(CH_2)_q$—O—$CF_2CHF$—O—$R_f$, preferably at least two $R_f$ groups, either as $R^5$ and/or in the siloxane unit with the subscript m. In some embodiments p is at least one, preferably at least 2. $R_f$ may contain 1 to 8, preferably 1 to 6, most preferably 3 to six, perfluorinated carbon atoms.

In some embodiment the ratio of m to p is from 100:0 to 5:95, preferably the ratio of m to p is from 50:50 to 20:80.

The disclosed fluoroalkyl silicones contain pendent or terminal —$(CH_2)_q$—O—$CF_2CHF$—O—$R_f$ group, which may further contain reactive hydrosilane groups (H—Si), alkoxysilane groups ($R^4$O—Si), alkyl silane groups (Si—$R^1$), either as $R^5$ and/or in the siloxane unit with the subscript p. In some embodiments the alkyl and alkoxy groups of the silicone can be long chains (e.g. $C_{16}$-$C_{50}$), either as $R^5$ and/or in the siloxane unit with the subscript p.

The novel fluoroalkyl silicone of Formula I may be prepared by hydrosilylation in the presence of a hydrosilylation catalyst, of a perfluoroalkyl alkenyl ether compound of the formula:

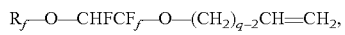

$$R_f\text{—O—CHFCF}_f\text{—O—}(CH_2)_{q-2}CH\text{=}CH_2, \quad\quad II$$

wherein
$R_f$ is a perfluoroalkyl group, optionally substituted by one or more in-chain —O—, —S— or —$NR_f^1$— heteroatoms, where $R_f^1$ is a perfluoroalkyl; with a hydrosilicone of the formula:

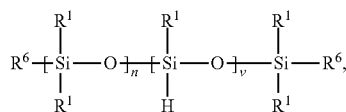

III where
each $R^1$ is independently an alkyl or aryl;
n is 0 to 2000; preferably al least 10;
v may be zero:
$R^6$ is H, alkyl or aryl;
with the proviso that the hydrosilicone contains at least one Si—H group, preferably at least two Si—H groups. Thus the silicone unit with the subscript "v" of Formula III may be at least one, preferably at least 2, and/or $R^6$ can be H.

All or a portion of the Si—H groups of the hydrosilicone may be reacted with the alkenyl ether of Formula II. In some embodiments, unreacted hydrosilyl (Si—H) groups may be converted to other useful functional groups, as described herein.

The fluoroalkyl silicone of Formula I have a $M_w$ of at least 400, preferably at least 1000. In some embodiments, the $M_w$ may be 2000 or greater. In some embodiments, the $M_w$ may be limited to 1,000,000 or less; preferably limited to 500,000 or less. In some embodiments n, m and p are each greater than one and where the ratio of n to m is greater than one, preferably the ratio of n to m is greater than 10. In some embodiments, $R^3$ is H, and the ratio of m to p is from 100:0 to 5:95. In some embodiments, $R^3$ is $OR^4$ (prepared as described herein).

The fluoroalkyl silicone of Formula I is prepared, in part, with at least one hydrosilicone having a plurality of Si—H groups as represented by Formula III. Examples of useful Si—H group containing silicones include hydride terminated polydimethylsiloxanes having the formula $HMe_2SiO$ $(SiMe_2O)_n SiMe_2H$ (CAS 70900-21-9); hydride terminated methylhydrosiloxane-dimethylsiloxane copolymers having the formula $HMe_2SiO(SiMe_2O)_n(SiMeHO)_q SiMe_2H$ (CAS 69013-23-6); trimethylsiloxane terminated polyethylhydrosiloxanes having the formula $Me_3SiO(SiMeHO)_q SiMe_3$ (CAS 63148-57-2); trimethylsiloxane terminated methylhydrosiloxane-dimethylsiloxane copolymers having the formula $Me_3SiO(SiMe_2O)_n(SiMeHO)_q SiMe_3$ (CAS 68037-59-2); triethylsiloxane terminated polyethylhydrosiloxanes having the formula $Et_3SiOSiEtHO)_q SiEt_3$ (CAS 24979-95-1); hydride terminated poly(phenyl-dimelhylhydrosiloxysiloxanes) having the formula $HSiMe_2O(SiPh(OSiMe_2H)O)_q$ $SiMe_2H$; all commercially available from vendors such as, for example, Gelest, Inc. or Dow Corning Corp. with different molecular weights.

It will be appreciated that the $R_f$ group of the fluoroalkyl compound of Formula II may be linear or branched or a combination thereof. The perfluoroalkyl alkenyl ether compounds of Formula II, in turn, may be prepared by reaction of a perfluoro(alkyl vinyl ether) compound of the formula:

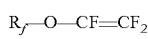

$$R_f\text{—O—CF=CF}_2 \quad\quad IV$$

with a compound of the formula:

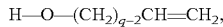

$$H\text{—O—}(CH_2)_{q-2}CH\text{=}CH_2, \quad\quad VI$$

where q and $R_f$ are as previously defined.

The reaction between compounds IV and VI is described in US 2005/0113609 (Furakawa et al.) incorporated herein by reference. The perfluoro(alkyl ether) of Formula IV, in turn, may be prepared by fluoride ion catalyzed addition of a perfluorinated acid fluoride to hexafluoropropylene oxide, followed by decarboxylation, according to the techniques describe in U.S. Pat. No. 6,255,536 (Worm et al.), incorporated herein by reference. Perfluorinated acid fluoride may be obtained from hexafluoropropene oxide by reaction with MF or by electrochemical fluorination process as described in U.S. Pat. No. 6,482,979 (Hintzer et al.), incorporated herein by reference. Alternatively, the perfluorinated acid fluorides may be prepared by electrochemical fluorination of alcohols, acids or esters as known in the art.

Commercial available perfluorovinyl ethers of Formula IV are, for example, $CF_3OCF\text{=}CF_2$, $CF_3CF_2CF_2OCF\text{=}CF_2$ and $CF_3OCF_2CF_2CF_2OCF\text{=}CF_2$.

In the presence of the hydrosilylation catalyst, the compounds of Formula II are hydrosilated by the hydrosilicone of Formula III to produce the fluoroalkyl silicones of Formula I. All or a portion of the Si—H groups may undergo the hydrosilylation with the compound of Formula II. In the following Scheme I, subscription "q" represent the number of original in-chain hydrosilane units, m the number of those in-chain units substituted by hydrosilylation, and subscript s is the number of in-chain Si—H groups remaining. In addition, where $R^6$ is H, all or a portion of those terminal Si—H groups may undergo hydrosilylation to provide terminal $R_f$ groups m the $R^7$. In some embodiments, all of the Si—H groups, whether terminal or in-chain, will be converted to —$(C_3H_6$—$OCF_2CHFOR_f$ groups. It will further be understood that hydrosilylation of the fluoroalkyl alkenyl ether of Formula II can yield two propyl isomers: propylene (Si—$(CH_2)_3$—) and isopropylene (Si—$CH(CH_3)CH_2$—) when q=3. These two isomers are illustrated genetically as —$C_3H_6$— as part of —$(CH_2)_q$—.

Scheme I

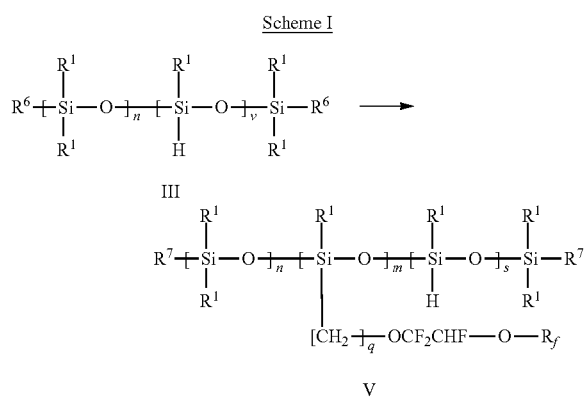

where
each $R^1$ is independently an alkyl or aryl;
n is 0 to 2000;
m may be zero, preferably at least 1;
s may be zero;
$R^6$ is H, alkyl or aryl;
$R^7$ is H, alkyl, aryl or —$(C_3H_6)$—$OCF_2CHF$—O—$R_f$,
q is at least 3; and
$R_f$ is a perfluoroalkyl group, optionally substituted by one or more in-chain —O—, —S— or —$NR_f^1$-heteroatoms, where $R_f^1$ is a perfluoroalkyl;
with the proviso that the starting material of Formula III contain at least one, preferably at least two Si—H groups, and with the proviso that the product of Formula V contains at least one, preferably at least two —$(C_3H_6)$—$OCF_3CHFOR_f$ groups, whether in-chain represented by the units with subscript m, and/or one or both of the $R^7$ groups may be —$(C_3H_6)$—$OCF_2CHFOR_f$ groups. Additionally, where there is partial hydrosilylation of the compounds of Formula II, the product of Scheme I will further contain in-chain Si—H groups, represented by the units with subscript s, and/or one or both of the $R^7$ groups may be H. It will be understood that the unit with the subscript "s" represents the proportion of Si—H groups not reacted by hydrosilation (i.e. m+s=v).

Alternatively, the fluoroalkyl silicones of the formula I can be made by hydrosilylation of perfluoroalkyl alkenyl ether compound of the formula II with either H—$Si(R^1)X_2$ to form $R_fO$—$CHFCF_2$—O—$(CH_2)_q SiR^1X_2$, wherein X is a hydrolysable group (e.g. Cl, $CH_3C(O)O$— $CH_3O$— and $CH_3CH_2O$—), following hydrolysis condensation polymerization; or cyclic hydrosilane, —[O—$SiR^1H$]w-, to form cyclic silane substituted with $R_f$—O—$CHFCF_2$—O—$(CH_2)_q$—, wherein w is 3 or 4, following by ring opening polymerization, as known from reported literatures.

Regarding the hydrosilylation reaction, numerous patents teach the use of various complexes of cobalt, rhodium, nickel, palladium, or platinum as catalysts for hydrosilylation reactions. For example, U.S. Pat. No. 4,288,345 (Ashby et al) discloses as a catalyst for hydrosilylation reactions a platinum-siloxane complex. Additional platinum-siloxane complexes are disclosed as catalysts for hydrosilylation reactions in U.S. Pat. Nos. 3,715,334, 3,775, 452, and 3,814,730 (Karstedt et al). U.S. Pat. No. 3,470,225 (Knorre et al) discloses production of organic silicon compounds by addition of a compound containing silicon-bonded hydrogen to organic compounds containing at least one non-aromatic double or triple carbon-to-carbon bond using a platinum compound of the empirical formula $PtX_2$ (RCOCR'COR")$_2$ wherein X is halogen. R is alkyl, R' is hydrogen or alkyl, and R" is alkyl or alkoxy.

The catalysts disclosed in the foregoing patents are characterized by their high catalytic activity. Other platinum complexes for accelerating the aforementioned thermally-activated addition reaction include: a platinacyclobutane complex having the formula $(PtCl_2C_3H_2$ (U.S. Pat. No. 3,159,662, Ashby); a complex of a platinous salt and an olefin (U.S. Pat. No. 3,178,464, Pierpoint); a platinum-containing complex prepared by reacting chloroplatinic acid with an alcohol, ether, aldehyde, or mixtures thereof (U.S. Pat. No. 3,220,972, Lamorcaux); a platinum compound selected from trimethylplatinum iodide and hexamethyldiplatinum (U.S. Pat. No. 3,313,773. Lamoreaux); a hydrocarbyl or halohydrocarbyl nitrile-platinum (II) halide complex (U.S. Pat. No. 3,410,886, Joy); a hexamethyldipyridine-diplatinum iodide (U.S. Pat. No. 3,567,755, Seyfried et al); a platinum curing catalyst obtained from the reaction of chloroplatinic acid and a ketone having up to 15 carbon atoms (U.S. Pat. No. 3,814,731, Nitzsche et al); a platinum compound having the general formula $(R')PtX_2$ where R' is a cyclic hydrocarbon radical or substituted cyclic hydrocarbon radical having two aliphatic carbon-carbon double bonds, and X is a halogen or alkyl radical (U.S. Pat. No. 4,276,252, Kreis et al); platinum alkyne complexes (U.S. Pat. No. 4,603,215, Chandra et al.); platinum alkenylcyclohexene complexes (U.S. Pat. No. 4,699,813, Cavezzan); and a colloidal hydrosilylation catalyst provided by the reaction between a silicon hydride or a siloxane hydride and a platinum (0) or platinum (II) complex (U.S. Pat. No. 4,705,765, Lewis).

Although these platinum complexes and many others are useful as catalysts in processes for accelerating the hydrosilylation, processes for promoting the ultraviolet or visible radiation-activated addition reaction between these compounds may be preferable in some instances. Platinum complexes that can be used to initiate ultraviolet radiation-activated hydrosilylation reactions have been disclosed, e.g., platinum azo complexes (U.S. Pat. No. 4,670,531, Eckberg); ($\eta^4$-cyclooctadiene)diarylplatinum complexes (U.S. Pat. No. 4,530,879, Drahnak); and ($\eta^5$-cyclopentadicnyOtrialkylplatinum complexes (U.S. Pat. No. 4,510,094, Drahnak). Other compositions that are curable by ultraviolet radiation include those described in U.S. Pat. Nos. 4,640,939 and 4,712,092 and in European Patent Application No. 0238033. U.S. Pat. No. 4,916,169 (Boardman et al) describes hydrosilylation reactions activated by visible radiation. U.S. Pat. No. 6,376,569 (Oxman et al.) describes a process for the actinic radiation-activated addition reaction of a compound containing silicon-bonded hydrogen with a compound containing aliphatic unsaturation, said addition being referred to as hydrosilylation, the improvement comprising using, as a platinum hydrosilylation catalyst, an ($\eta^5$-cyclopentadienyl) tri(σ-aliphatic)platinum complex, and, as a reaction accelerator, a free-radical photoinitiator capable of absorbing actinic radiation, i.e., light having a wavelength ranging from about 200 nm to about 800 nm. The process can also employ, as a sensitizer, a compound that absorbs actinic radiation, and that is capable of transferring energy to the aforementioned platinum complex or platinum complex/free-radical photoinitiator combination, such that the hydrosilylation reaction is initiated upon exposure to actinic radiation. The process is applicable both to the synthesis of low molecular weight compounds and to the curing of high molecular weight compounds, i.e., polymers.

Combinations of the hydrosilylation catalysts and photocatalysts and/or curing methods may also be used.

The catalyst is typically present in an amount that is effective to catalyze the hydrosilylation reaction. More typically, the catalyst is present in amounts sufficient to provide as little as one part of catalyst, or less, per million parts of the Si—H groups of the silicone polymer. On the other hand, amounts of the catalyst sufficient to provide as high as 1 to 10, or more, parts of catalyst per 1,000 parts of the Si—H groups of the silicone polymer may also be used. All or a portion of the Si—H groups may be functionalized with the perfluoroalkyl group.

In the presence of the hydrosilylation catalyst, hydrosilylation of hydrosilicone of Formula III with the compounds of Formula II readily produce the fluoroalkyl silicones of Formula I in high yield under mild conditions, such as at room temperature. The fluoroalkyl allyl ether of formula II demonstrated high reactivity to hydrosilicones, and the reaction may be controlled by slowly addition of hydrosilicone into the solution of fluoroalkyl allyl ether and catalyst—with or without solvent. In contrary, almost no product was observed from $C_4F_9CH=CH_2$ under similar conditions, indicating the significantly higher reactivity of perfluoroalkyl alkenyl ether in comparison with perfluoroalkylethylene.

Regarding the product of Formula V of Scheme I, the Si—H functional fluoroalkyl silicones may be used as a crosslinking agent, such as to thermally crosslink with silicones or fluorinated silicones having a plurality of ethylenically unsaturated bonds in a subsequent hydrosilylation reaction. In some embodiments, the fluoroalkyl silicone may be subsequently crosslinked by vinyl substituted silicones: i.e. silicone having a plurality of vinyl groups.

The non-fluorinated organopolysiloxane polymers (vinyl silicones) comprising an average of at least two ethylenically unsaturated organic groups may be formulated with the fluoroalkyl silicone of Formula V. In some embodiments, the non-fluorinated organopolysiloxane polymer has a vinyl equivalent weight of no greater than 60,000 grams per equivalent, e.g., no greater than 20,000, or even no greater than 10,000 grams per equivalent. In some embodiments, the non-fluorinated organopolysiloxane polymer has a vinyl equivalent weight of 2000 to 5000 grams per equivalent, e.g., 2000 to 4000 grams per equivalent, or even 2500 to 3500 grams per equivalent.

Exemplary non-fluorinated organopolysiloxane polymers include those comprising a triorganosiloxy endblocked polydiorganosiloxane polymer. In some embodiments, the non-fluorinated organopolysiloxane polymer comprises $R_2SiO_{2/2}$ units (i.e., "D" units) and $R_3SiO_{1/1}$ units (i.e., "M" units), wherein each R group independently represents a saturated or ethylenically unsaturated, substituted or unsubstituted hydrocarbon radical, provided that at least two R groups contain terminal ethylenic unsaturation.

The ethylenically unsaturated radicals are independently selected from the group consisting of the vinyl radical and higher alkenyl radicals represented by the formula —R'—CH=CH wherein R' denotes —$(CH_2)_w$—; and w has the value of 1-48.

In some embodiments, trace amounts of non-linear siloxane units, i.e., $SiO_{4/2}$ units (i.e., "Q" units) and $RSiO_{3/2}$, units (i.e., "T" units); may be present wherein R is as described above. In some embodiments, trace amounts of other silicon-bonded radicals, such as hydroxyl and alkoxyl may also be present.

Exemplary non-fluorinated organopolysiloxane polymer comprising an average of at least two ethylenically unsaturated organic groups include those having the formula $M^{vi}D_xM^{vi}$ wherein M represents M units, D represents D units, the superscript "vi" indicates the presence of vinyl-functional groups, and x is the degree of polymerization. Commercially available $M^{vi}D_xM^{vi}$, non-fluorinated organopolysiloxane polymers include those available under the trade designations DMS-V from Gelest Inc. (e.g., DMS-V03, DMS-V05, DMS-V21, DMS-V22, DMS-V25, DMS-V35, and DMS-V41).

Examples of useful silicone having a plurality of vinyl groups include vinyl terminated polydimethylsiloxanes having the formula $H_2C=CHSiMe_2O(SiMe_2O)_n SiMe_2CH=CH_2$ (CAS 68083-19-2); vinyl terminated dimethylsiloxane-diphenylsiloxane copolymers having the formula $H_2C=CHSiMe_2O(SiMe_2O)_n(SiPh_2O) mSiMe_2CH=CH_2$ (CAS: 68951-96-2); vinyl terminated polyphenylmethylsiloxanes having the formula $H_2C=CHSiMePhO(SiMePhO)_n SiMePhCH=CH_2$ (CAS: 225927-21-9); vinyl-phenylmethyl terminated vinylphenylsiloxane-methylphenylsiloxane copolymers (CAS: 8027-82-1); vinyl terminated trifluoropropylmethylsiloxane-dimethylsiloxane copolymers having the formula $H_2C=CHSiMePhO(SiMe_2O)_2(SiMe(CH_2CH_2CF_2)_m SiMePhCH=CH_2$ (CAS: 68951-98-4); $H_2C=CHSiMe_2O—(SiMe_2O)_n(SiMe(CH_2CH_2CF_3)O)_m SiMe_2CH=CH_2$, $H_2C=CHSiMe_2O—(SiMe_2O)_n(SiMe(CH_2CH_2C_4F_9)O)_m SiMe_2CH=CH_2$, vinyl terminate dimethylsiloxane-diethylsiloxane copolymers having the formula $H_2C=CHSiMe_2O(SiMe_2O)_n(SiEt_2O)_n SiMe_2CH=CH_2$; trimethylsiloxy terminated vinylmethylsiloxane-dimethylsiloxane copolymers $Me_3SiO(SiMe_2O)_n (SiMe(CH=CH_2)O)_m SiMe_3$ (CAS: 67762-94-1); vinyl terminated vinylmethylsiloxane-dimethylsiloxane copolymers having the formula $H_2C=CH(SiMe_3O)_n(SiMeCH=CH_3 O)_m SiMe_3CH=CH_2$ (CAS: 68063-18-1); vinylmethylsiloxane homopolymers (cyclic and linear) having the formula $Me_3SiO(SiMe(CH=CH_2)O)_n SiMe_3$; and vinyl T-structure polymers having the formula $MeSi[O(SiMe_2O)_m SiMe_2CH=CH_2]_3$; all commercially available from vendors such as, for example, Gelest, Inc., Morrisville, Pa. or Dow Corning Corp., Midland. Mich. Additional useful silicones having a plurality of vinyl groups include a vinyl-terminated fluorosilicone that is commercially available under the trade designations "SYL-OFF Q2-7785" and "SYL-OFF Q2-7786" from Dow Corning Corp.

In some embodiments, the Si—H group of Formula V, Scheme I may be converted to alkyl groups by subsequent hydrosilylation of an olefin of the formula: $CH_2=CHCH_2— R^4$ where $R^4$ is H or $C_1$-$C_{50}$ alkyl in the presence of a hydrosilylation catalyst.

Again with regard to the silicone of Formula V, Scheme I the Si—H groups may be converted to alkoxide groups (Si—H→Si—$OR^4$) and the alkoxy-functional fluoroalkyl silicone can be subsequently hydrolysis-condensation crosslinked by siloxane formation. Generally, the hydrides are reacted with an alcohol of the formula $R^4$—OH to convert all or a portion of the Si—H groups to Si—$OR^4$ groups, where $R^4$ is a $C_1$-$C_{50}$ alkyl, preferably a short alkyl group for easy hydrolysis. Thus the present disclosure provides crosslinkable, fluoroalkyl silicones of the formula:

IV

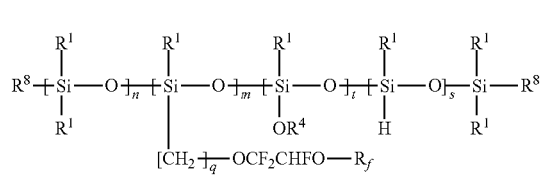

wherein n is 0 to 2000, m may be zero, preferably at least one;

s may be zero;

t may be zero, preferably at least one;

$R^8$ is H, alkyl or aryl, —$(CH_2)_q$—$OCF_2CHFOR_f$ or $OR^4$, where $R^4$ is $C_1$-$C_{50}$ alkyl;

q is at least 3; and $R_f$ is a perfluoroalkyl group, optionally substituted by one or more in-chain —O—, —S— or —$NR_f^1$-heteroatoms, where $R_f^1$ is a perfluoroalkyl;

with the proviso that the silicone contains at least one, preferably at least two Si—$OR^4$ groups and the silicone contains at least one —$(CH_2)_q$—O—$CF_2CHF$—O—$R_f$ group. In Formula IV, the unit with the subscript t may be at least one, preferably at least two, and/or $R^8$ may be —$OR^4$. Further, if only a portion of the Si—H groups are convened to alkoxysilane groups (Si—$OR^4$), then s may be at least one, and/or a portion of $R^8$ may be H. Further, the unit with the subscript m may be at least one, and/or a portion of the $R^8$ groups may be —$(CH_2)_q$—O—$CF_2CHF$—O—$R_f$. In some embodiments $R^4$ is lower-chain alkyl ($C_1$-$C_{16}$, preferably $C_1$-$C_4$). In other embodiments $R^4$ is long-chain alkyl ($C_{18}$-$C_{50}$)

Subsequently, these alkoxide groups (Si—$OR^4$) may be hydrolyzed by moisture, then crosslinked by dehydration, which can be catalyzed by a acid, or acid from a photoacid generator (PAG) initiated by photo irradiation, or a thermal acid generator initiated by heating to form siloxane Si—O—Si crosslinked polymers. The acid generator is preferably free of amines or ammonium compounds. The crosslinking of alkoxide substituted silicones by photo irradiation in the presence of PAG is described in U.S. Pat. No. 6,129,980 or WO 9840439 (Liu et al.), incorporated herein by reference.

The conversion of all or a portion of the Si—H groups in the silicone to alkoxide groups by reacting the hydropolysiloxane with an alcohol in the presence of at least one of a Pd(0) and Pt(0) catalyst according to the methods of U.S. Ser. No. 61/739,277 (Rathore et al.) filed 19 Dec. 2012 and incorporated herein by reference.

A wide variety of acid generating materials can be used in the practice of the invention to catalyze the moisture curing reaction, including onium salts such as sulfonium and iodonium salts. Activating the acid generating material liberates an acid that initiates and accelerates crosslinking of the moisture-curable composition through the formation of Si—O—Si crosslinks. Activation may be accomplished by irradiating the composition with, for example, ultraviolet, visible light, electron beam or microwave radiation. While heat may be used to activate the acid generating material, the compositions of the invention advantageously do not require this and thereby can avoid undesirable damage to heat sensitive substrates.

Although the acid generating material described above is preferred due to the controlled curability it provides, it has been found that condensation catalysts, such as strong organic acids, weak Lewis acids, weak organic bases and metal chelates can also be used in the preparation of the novel silicone pressure-sensitive adhesive. Another preferred class of condensation catalyst is the strong organic acids having pKa values of less than about 3 and the anhydrides and ammonium salts thereof described in U.S. Pat. No. 5,286,815. Examples of useful strong organic acids and derivatives include trichloroacetic acid, cyanoacetic acid, malonic acid, nitroacetic acid, dichloroacetic acid, difluoroacetic acid, trichloroacetic anhydride, dichloroacetic anhydride, difluoroacetic anhydride, triethylammonium trichloroacetate, trimethylammonium trichloroacetate, and mixtures thereof.

The condensation catalyst or an acid generating material is used in amounts of about 0.5 to about 20 parts by weight, based on 100 parts by weight of the alkoxy functional silicone.

The fluoroalkyl silicone of Formula IV contains both Si—$OR^4$ and Si—H functional groups are dual curable, which may be controllably cured initially via Si—H with a vinyl silicone, then moisture or photo-acid cured from Si—$OR^4$ or vice versa.

The fluoroalkyl silicone release materials of Formula I can be blended with one or more additional low surface energy materials (e.g., a fluoropolymer or silicone) while maintaining the desired low release characteristics of the fluorosilicone material, even when the additional low surface energy material itself is not a release material. In addition, in some embodiments, high blend ratios may be used without detrimentally affecting the readhesion force of the adhesive after removal for the blended release materials of the present disclosure.

Exemplary low surface energy materials that may be blended with the fluoroalkyl silicone release polymer of Formula I include additional fluorosilicone polymers, including those described herein, as well as non-fluorinated silicones and fluoropolymers.

Fluoropolymers can be prepared from a wide variety of fluorinated ethylenes and non-fluorinated monomers. As used herein, the term "fluorinated" includes both perfluorinated and partially-fluorinated materials.

Generally, any known fluorosilicone release polymer may be used. The term "fluorosilicone" means a silicone material comprising at least some fluorine atoms on a pendent groups (i.e. fluoroalkyl). Exemplary fluorosilicone release coatings include release coating compositions derived from organopolysiloxanes having fluorine containing organic groups and alkenyl groups an organohydrogensiloxane crosslinking agent and a platinum-containing catalyst. Other fluorosilicone release coatings may be derived from, e.g., organopolysiloxanes having fluorine containing organic groups and silicon-bonded hydrogen groups, an alkenyl functional organopolysiloxane and a platinum-containing catalyst.

A number of useful commercially available fluorosilicone polymers are available from Dow Corning Corp. (Midland, Mich.) under the SYL-OFF and the SYL-OFF ADVANTAGE series of trade designations including, e.g., SYL-OFF Q2-7785 and SYL-OFF Q2-7786. These fluorosilicone polymers are particularly useful in forming release coating compositions when combined with a suitable crosslinking agent. One useful crosslinking agent is available under the SYL-OFF Q2-7560 trade designation from Dow Corning Corp. Other useful crosslinking agents are disclosed in U.S. Pat. No. 5,082,706 (Tangney) and U.S. Pat. No. 5,578,381 (Hamada et al.). Other fluorosilicone polymers are commercial available from General Electric Co. (Albany, N.Y.), Wacker Chemie (Germany), Akrosil (Menasha. Wis.), and Loparex (Willowbrook, Ill.). Other fluorosilicone polymers are available from Momentive (FSR2000), and Siliconature (Scotchpak 9741 and M117)

One class of fluoropolymers is based upon fluorinated olefinic monomers such a tetrafluoroethylene (TFE), hexafluoropropylene (HFP), vinyl fluoride (VF), vinylidene a fluoride (VDF). In some embodiments, the fluoroolefin-based fluoropolymers may be homopolymers or copolymers of fluorinated olefinic monomers. In some embodiments, the fluoroolefin-based fluoropolymers may be copolymers of one or more fluorinated olefinic monomers and one or more other monomers, including, e.g., non-fluorinated olefins such as ethylene, chlorinated olefins such as chlorotrifluoroethylene, and fluorinated vinyl ethers such as trifluoromethylvinylether.

In some embodiments, the fluoroolefin-based polymers may be amorphous fluoropolymers. As used herein, amorphous fluoropolymers are materials that exhibit essentially no crystallinity or possess no significant melting point as determined for example by differential scanning calorimetry (DSC). In some embodiments, the amorphous fluoropolymers are elastomeric. In some embodiments the elastomeric fluoropolymers may comprise, e.g., interpolymerized units derived from VDF, HFP, and, optionally. TFE monomers. Examples of such are commercially available from 3M Company under the trade names Dyneon™ Fluoroelastomer FC 2145 and FT 2430, Additional amorphous fluoropolymers include, e.g., VDF-chlorotrifluoroethylene copolymers, commercially available under the trade name Kel-F™ 3700, from 3M Company.

In some embodiments, the fluoroolefin-based polymers may be homopolymers and copolymers that do exhibit crystalline melting point. Exemplary crystalline fluoropolymers include those based on fluorinated monomers such as TFE or VDF such as polyvinylidene fluoride (PVDF), available commercially from 3M Company as Dyneon™ PVDF, or thermoplastic copolymers of TFE such as those based on the crystalline microstructure of TFE-HFP-VDF, e.g., those available from 3M under the trade name Dyneon™ Fluoroplastic THV™ 220.

In some embodiments, the fluoroolefin-based polymers may include PVDF-containing fluoroplastic materials having very low molar levels of HFP such as those sold under the trade name Dyneon™ PVDF 6010 or 3100, available from Dyneon LLC, of St. Paul, Minn.; and Kynar™ 740, 2800, 9301, available from Elf Atochem North America Inc.

A separate class of fluoropolymers useful in some embodiments of the present disclosure are fluoroacrylate polymers, which are based upon (meth)acrylates (i.e., acrylates and/or methacrylates) having pendant fluoroalkyl groups. Fluoroacrylate polymers derived from fluoroacrylate monomers and multi-(meth)acrylates such a polyethylene glycol diacrylate (PEGDA) or 1,6-hexanediol diacrylate (HDDA) will form nonlinear (e.g., branched and/or cross-linked) fluoropolymers. Fluoroacrylate polymers derived from fluoroacrylate monomers and mono-(meth)acrylates such as $C_1$-$C_{50}$ acrylates (e.g., $C_4$-$C_{20}$ acrylates such as butyl acrylate, isooctyl acrylate, 2-ethylhexyl acrylate, and octadecyl acrylate) form linear fluoropolymers.

Such fluoroacrylate monomers can be polymerized to yield a fluorinated acrylic polymer as described in U.S. Pat. No. 7,199,197 (Caldwell et al.) and U.S. Pat. No. 7,297,210 (Qui et al.). The fluoroacrylate monomers can also be copolymerized with one or more comonomers such as mono-(meth)acrylate monomers to produce linear fluoropolymers according to some embodiments of the present disclosure. In some embodiments, the comonomer may be an alkyl mono-(meth)acrylate. In some embodiments, the alkyl mono-(meth)acrylate is a $C_1$-$C_{50}$, e.g., a $C_4$ to $C_{20}$, alkyl mono-(meth)acrylate. Representative examples of useful alkyl mono-(meth)actylates include methyl(meth)acrylate, butyl(meth)acrylate, isobutyl (meth)acrylate, hexyl (meth)acrylate, dodecyl(meth)acrylate, octadecyl(meth) acrylate, and 2-ethylhexyl(meth)acrylate.

The ratio of fluoroalkyl silicone release composition to fluoropolymer (e.g., linear fluoroacrylate polymer or fluoroolefinic polymer) can vary widely. For example, in some embodiments, the weight ratio of the fluoroalkyl silicone release polymer of Formula I to the linear fluoropolymer is no greater than 10:1, no greater than 5:1, or even no greater than 3:1. In some embodiments, it may be desirable to minimize the amount of the relatively expensive fluoroalkyl silicone release polymer of Formula I, while retaining the required release and readhesion properties. In some embodiments, the weight ratio of the fluoroalkyl silicone release polymer of Formula I to the linear fluoropolymer is no greater than 1:1, no greater than 1:5, no greater than 1:10, or even no greater than 1:20. For example, in some embodiments the weight ratio of the fluoroalkyl silicone release polymer of Formula I to the linear fluoropolymer is between 10:1 and 1:20, e.g., between 3:1 and 1:20, inclusive; between 2:1 and 1:10, inclusive (e.g., between 1:1 and 1:10, inclusive), or even between 2:1 and 1:3.

In other embodiments, the fluoroalkyl silicone of Formula I may be blended with non-fluorinated silicone polymers, including vinyl-substituted (described supra), hydrogen (Si—H) substituted silicone polymers, and non-functional silicone polymers. As previous described for the vinyl-substituted silicone polymers, the hydrogen-substituted and non-functional silicone polymers may comprise M, D, T and Q units. Vinyl-substituted and hydrogen-substituted (Si—H) silicone polymers are described in U.S. Pat. No. 7,279,210 (Qiu et al.), incorporated herein by reference.

Coatings

The present disclosure further provides coating compositions comprising the fluoroalkyl silicone of Formula I in a suitable solvent. In some embodiments, the disclosure provides crosslinkable coating compositions comprising the fluoroalkyl silicone of Formula I and a crosslinking agent in a stable solvent. In other embodiments, the fluoroalkyl silicone of Formula IV, containing hydrolysable Si—$OR_4$ groups, is self-crosslinking by formation of siloxane bonds.

The term "coatable" or "coatable composition" means that the composition is soluble or dispersible in solvents or water and is substantially gel-free and, that it can be applied to a substrate using standard coating methods, and that it forms a film upon heating or curing. The coatable compositions of the invention can be used to impart release properties to a wide variety of substrates.

The coatable compositions we preferably diluted or dispersed in a liquid (for example, water and/or an organic solvent) before coating a substrate. Preferably, the coating compositions contain from about 5 to about 15 percent solids (more preferably, about 2 to about 10 percent), based upon the weight of the coating composition.

The coatable compositions can be applied to fibrous substrates (for example, woven, knit and non-woven fabrics, textiles, carpets, leather, or paper) to impart water- and oil-repellency. The coatable compositions can be applied to a substrate (or articles comprising a substrate) by standard methods such as, for example, spraying, padding, dipping, roll coating, brushing, or exhaustion.

The composition can then be dried to remove any remaining water or solvent. Preferably, the coated composition is heated to a temperature between about 100° C. and about 175° C. The coatable compositions are useful as release coatings, and can be applied to surfaces requiring release properties from adhesives. Surprisingly, dried coatable compositions of the invention show significant solvent resistance. The coatable compositions can therefore be used as release coatings for solvent cast adhesives.

Substrates suitable for release coatings include, for example, paper, metal sheets, foils, non-woven fabrics, polyolefin coated paper, and films of thermoplastic resins such as polyesters, polyamides, polyolefins, polycarbonates, and polyvinyl chloride. Release coating compositions can be applied to suitable substrates by conventional coating techniques such as, for example, wire-wound rod, direct gravure, offset gravure, reverse roll, air-knife, and trailing blade coating. The resulting release coating compositions can provide effective release for a wide variety of pressure sensitive adhesives such as, for example, natural rubber based adhesives, silicone based adhesives, acrylic adhesives, and other synthetic film-forming elastomeric adhesives.

EXAMPLES

Materials:
$C_3F_7OCHFCF_2OCH_2CH=CH_2$ (PE5) was made from $C_3F_7OCF=CF_2$ and $HOCH_2CH=CH_2$ by similar procedures described in US Patent Publication No. 2005/0113609, except that 1,2-dimethoxyethane (from GFS Chemicals, Inc.) was used as solvent.

1,2-dimethoxyethane was obtained from GFS Chemicals, Inc., Powell, Ohio. "Syl-Off 7048" is a 100 weight percent solids silane crosslinker (said to comprise methylhydrogen cyclosiloxane, Viscosity—30 centistokes) having H—Si equivalent weight of 60, obtained from Dow Corning Corporation, Midland, Mich., under the trade designation "Syl-Off® 7048".

"Pt-Cat" (Karstedt catalyst) was bis(1,3-divinyl-1,1,3,3-tetrametyldisiloxane) platinum(0) (2 wt % platinum in xylene), purchased from Gelest, Inc., Morrisville, Pa. and kept in the dark before use.

"Q2-7785" is an 80 wt % solution of fluorosilicone polymer dispersed in heptane, obtained from Dow Corning Corporation, Midland, Mich., under the trade designation of "Syl-Off® Q2-7785", having the following structure:

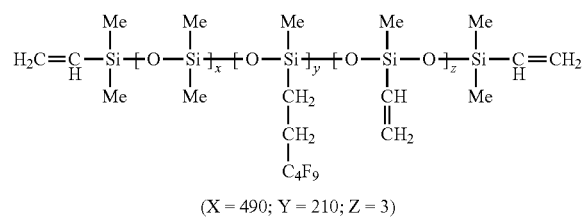

(X = 490; Y = 210; Z = 3)

"Q2-7786" is a 100 wt % fluorosilicone polymer obtained from Dow Corning Corporation, Midland, Mich., under the trade designation of "Syl-Off® Q2-7786", having the following structure:

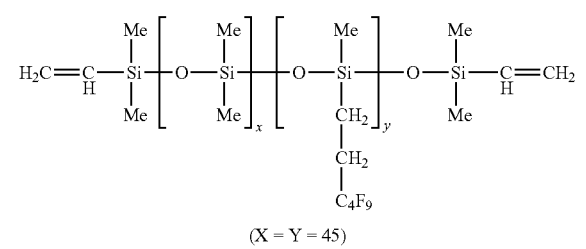

(X = Y = 45)

"Q2-7560" is a 100 wt % crosslinker, obtained from Dow Corning Corporation, Midland, Mich., under trade designation "Syl-Off® Q2-7560" having the following structure:

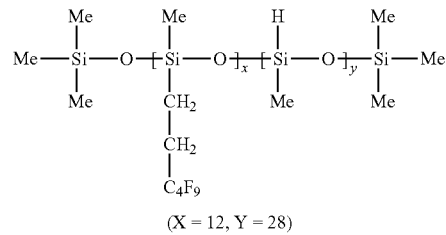

(X = 12, Y = 28)

Test Methods
Method for % Extractable Silicone Test

The silicone coat weight of a 3.69 centimeter diameter sample of coated substrate was determined by comparing samples of coated and uncoated substrates using an EDXRF spectrophotometer (obtained from Oxford Instruments, Elk Grove Village, Ill. under trade designation OXFORD LAB X3000).

Unreacted silicone extractables were measured on cured thin film formulations of Example and Comparative Example samples described below to ascertain the extent of silicone crosslinking immediately after the coatings were cured. The percent extractable silicone, (i.e., the unreacted silicone extractables), a measure of the extent of silicone cure on a release liner, was measured by the following method: The coated substrate sample was cured at then immersed in and shaken with methyl isobutyl ketone (MIBK) for 5 minutes, removed, and allowed to dry. The silicone coating weight was measured again. Silicone extradables were attributed to the weight difference between the silicone coat weight before and after extraction with MIBK as a percent using the following formula:

Extractable Silicone $\% = (a-b)/a * 100\%$

Where a=initial coating weight (before extraction with MIBK); and
b=final coating weight (after extraction with MIBK).
Every number is the average of at least two tests.

Method for Release Test
Release Test

An IMASS SP2000 slip peel tester (obtained from IMASS Inc., Accord, Mass.) was used for all release tests. Tests were performed at 21° C. at 50% RH. A piece of 2.54 cm wide 3M Tape 610 (commercially available from 3M Company, St. Paul, Minn. under trade designation "Scotch® Premium Cellophane Tape 610") was laminated to the sample coatings with a 2 kg rubber roller, then peeled at an angle of 180° at the speed of 2.29 m per minute in 5 seconds. Typically, 3 measurements were made and the mean reported.

Re-Adhesion Test on Stainless Steel

The 3M Tape 610 strips peeled in the Release test were laminated to a steel plate with a 2 kg rubber roller. An IMASS SP2000 slip peel tester was used to peel the tape at an angle of 180° at the speed of 30 cm per minute in 10 seconds. Typically, 3 measurements were made and the mean reported. When measuring re-adhesion for a sample, re-adhesion value of a pristine sample of 3M Tape 610 which was not contacted with release coatings was also determined (as an internal control) and the data for the control was reported along with the data for corresponding samples.

Method for Determining Contact Angle

Coated films prepared in Examples and Coated Examples described below were rinsed for 1 minute with hand agitation in an isopropanol (IPA) bath prior to water and hexadecane (HD) contact angles measurements. Measurements were made using a VCA-2500XE video contact angle analyzer (available from AST Products, Billerica, Mass.). Reported values are the average of at least 3 drops; each drop was measured twice. Drop volumes were 5 μL for static measurements and 1-3 μL for advancing and receding. For HD, only advancing and receding contact angles are reported because static and advancing values were found to be nearly equal.

Preparative Example 1 (PE1)

Preparation of —[SiMe($C_3H_6$OCHF$CF_2$O$C_3F_7$)n-O]—[SiMeH—O]m-, n/m=33/67

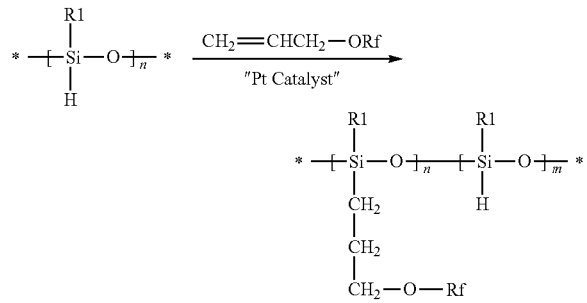

Pt-Cat [40 ppm] and $C_3F_7OCF_2CHFOCH_2CH=CH_2$ (8.3 g) was mixed together in a 100 mL round bottom flask followed by dropwise addition of the Syl-Off 7048 (5 g) through a dropping funnel at room temperature. The addition of Syl-Off 7048 resulted in the evolution of heat after 20-60 seconds of stirring. The mixture was stirred for an additional 30 minutes followed by the analysis of the mixture by FT-IR (Si—H at ~2160 $cm^{-1}$ reduced) and $^1$H NMR (Si—H at 4.5 ppm reduced). To isolate the product, any unreacted/residual $C_3F_7OCF_2CHFOCH_2CH=CH_2$ was then evaporated using vacuum. Yield—99% and the ratio of n:m was 33:67. Chemical shift of $^1$H-NMR: 5.8-5.9 (broad split peak); 4.57 (—SiH); 3.9 (b); 1.76 (b), 1.47 (b), 1.02 (broad), 0.63 (broad); 0.24 (broad, —SiCH$_3$) ppm.

Preparative Example 2 (PE2)

Preparation of —[SiMe($C_3H_6$OCHF$CF_2$O$C_3F_7$)n-O]—[SiMeH—O]m-, n/m=100/0

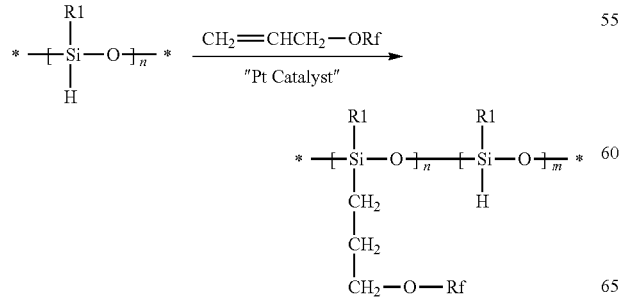

PE2 was prepared in the same manner as PE1 except that Pt-Cat [40 ppm] and $C_3F_7OCF_2CHFOCH_2CH=CH_2$ (28 g) was mixed together in a 100 mL round bottom flask followed by drop wise addition of the Syl-Off 7048 (5 g) through a dropping funnel at room temperature. Yield—99% and the ratio of n:m is 100:0. Chemical shift of $^1$H-NMR: 5.8-5.9 (broad split peak); 3.9 (b); 1.76 (b), 1.47 (b), 1.02 (broad), 0.63 (broad); 0.24 (broad, —SiCH$_3$) ppm.

Preparative Example 3 (PE3)

Preparation of —[SiMe($C_3H_6$OCHF$CF_2$O$C_3F_7$)n-O]—[SiMeH—O]m-, n/m=33/67

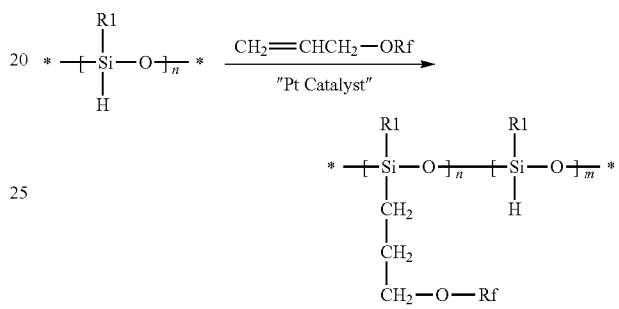

PE3 was prepared in the same manner as PE1 except that Pt-Cat [40 ppm] and $C_3F_7OCF_2CHFOCH_2CH=CH_2$ (16 g) was mixed together in a 100 mL round bottom flask followed by drop wise addition of the Syl-Off 7048 (5 g) through a dropping funnel at room temperature. Yield—99% and the ratio of n:m is 67:33. Chemical shift of $^1$H-NMR: 5.8-5.9 (broad split peal); 4.57 (—SiH); 3.9 (b); 1.76 (b), 1.47 (b), 1.02 (broad), 0.63 (broad); 0.24 (broad, —SiCH$_3$) ppm.

Preparative Example 4 (PE4)

Preparation of —[SiMe($C_3H_6$OCHF$CF_2$O$C_3F_7$)n-O]—[SiMeH—O]$_p$—, n/m/p=0.3/0.37/0.33

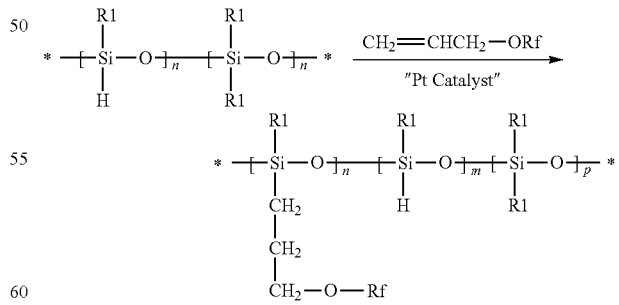

PE4 was prepared in the same manner as PE1 except that Pt-Cat [40 ppm] and $C_3F_7OCF_2CHFOCH_2CH=CH_2$ (5.4 g) was mixed together in a 100 mL round bottom flask followed by drop wise addition of the Syl-Off 7048 (5 g) through a dropping funnel at room temperature. Yield—99% and the ratio of n/m/p=0.30/0.37/0.33. Chemical shift of $^1$H-NMR: 5.8-5.9 (broad split peak); 4.57 (—SiH); 3.9 (b); 1.76 (b), 1.47 (b), 1.02 (broad), 0.63 (broad); 0.24 (broad, —SiCH$_3$) ppm.

Preparative Examples 5-13 (PE5-PE13)

Preparation of Fluorinated Alkenes

PE5-PE13 fluorinated alkenes were made according to the following reaction with different R$_f$ and different space linkages as shown below by similar procedures described in US Patent Publication No. 2005/0113609, except that 1,2-dimethoxyethane (from GFS Chemicals, Inc.) was used as solvent. The PE5-PE13 fluorinated alkenes were consequently useful for making various fluorinated silicones.

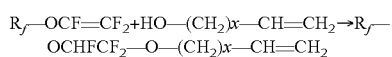

R$_f$—OCF=CF$_2$+HO—(CH$_2$)x—CH=CH$_2$→R$_f$—OCHFCF$_2$—O—(CH$_2$)x—CH=CH$_2$

PE5: C$_3$F$_7$OCHFCF$_2$OCH$_2$CH=CH$_2$, b.p. 112-115° C.
PE6: C$_3$F$_7$OCHFCF$_2$O(CH$_2$)$_2$CH=CH$_2$, b.p. 136-139° C.
PE7: C$_3$F$_7$OCHFCF$_2$O(CH$_2$)$_3$CH=CH$_2$, b.p. 70-72.5° C./39 mmHg
PE8: C$_3$F$_7$OCHFCF$_2$O(CH$_2$)$_4$CH=CH$_2$, b.p. 93-94° C./26 mmHg
PE9: C$_3$F$_7$OCHFCF$_2$O(CH$_2$)$_7$CH=CH$_2$, b.p. 93-97° C./5.3 mmHg
PE10: C$_3$F$_7$OCHFCF$_2$O(CH$_2$)$_9$CH=CH$_2$, b.p. 101-103° C./3.2 mmHg
PE11: CF$_3$O(CF$_2$)$_3$OCHFCF$_2$O(CH$_2$)$_2$CH=CH$_2$, b.p. 151-154° C.
PE12: CF$_3$O(CF$_2$)$_3$OCHFCF$_2$O(CH$_2$)$_4$CH=CH$_2$, b.p. 92-94° C./26 mmHg
PE13: C$_3$F$_7$OCF(CF$_3$)CF$_2$OCHFCF$_2$O(CH$_2$)$_2$CH=CH$_2$, b.p. 75-78° C./16 mmHg

Examples 1-19 (EX1-EX19) and Comparative Examples 1-12 (CE1-CE12)

EX1-EX19 coating solutions were prepared by first dissolving PE1, Q2-7785, and Q2-7786 thoroughly in a mixture of heptane/ethyl acetate (80:20 mixture by weight) to result in 10 or 20 wt % solutions then mixing PE1 solution with either Q2-7785 solution or Q2-7786 solution thoroughly. The concentration of the PE1/Q2-7785 mixture or PE1/Q2-7786 mixture in the coating solution was either 10 or 20% by weight.

CE1-CE12 coating solutions were prepared by first dissolving Q2-7560, Q2-7785, and Q2-7786 thoroughly in a mixture of heptane/ethyl acetate (80:20 mixture by weight) to result in 10 or 20 wt % solutions then mixing Q2-7560 solution with either Q2-7785 solution or Q2-7786 solution thoroughly. The concentration of the Q2-7560/Q2-7785 mixture or Q2-7560/Q2-7786 mixture in the coating solution was either 10 or 20% by weight.

The resulting EX1-EX 19 and CE1-CE12 coating solutions were then coated on a 2-mil (0.058 millimeter (mm)) thick polyester terephthalate (PET) film (obtained from Mitsubishi Polyester Film, Greer, S.C., under the trade designation "Hostaphan™ 3SAB", which has one side chemically treated or primed to improve the adhesion of silicone coatings) with different size of Mayer bars for different coating weights. All coatings were cured at 120° C. for 2 minutes in an oven equipped with solvent exhaust. Table 1, below, summarizes the compositions of the coating solutions as well as the size number of Meyer bars used for preparing the coatings.

TABLE 1

| Example | Ratio of components in coating solution (parts by weight) | | | | Solution concentration (wt. %) | Meyer bar used |
|---|---|---|---|---|---|---|
| | PE1 | Q2-7560 | Q2-7785 | Q2-7786 | | |
| EX1 | 1 | 0 | 16 | 0 | 10 | 6 |
| EX2 | 1 | 0 | 8 | 0 | 20 | 6 |
| EX3 | 1 | 0 | 16 | 0 | 20 | 12 |
| EX4 | 1 | 0 | 0 | 16 | 10 | 6 |
| CE1 | 0 | 1 | 32 | 0 | 10 | 6 |
| CE2 | 0 | 1 | 32 | 0 | 20 | 6 |
| CE3 | 0 | 1 | 32 | 0 | 20 | 12 |
| CE4 | 0 | 1 | 0 | 16 | 10 | 6 |
| CE5 | 0 | 1 | 32 | 0 | 20 | 6 |
| CE6 | 0 | 1 | 32 | 0 | 20 | 12 |
| EX5 | 1 | 0 | 8 | 0 | 20 | 3 |
| EX6 | 1 | 0 | 8 | 0 | 20 | 6 |
| EX7 | 1 | 0 | 8 | 0 | 20 | 12 |
| CE7 | 0 | 1 | 0 | 15 | 10 | 6 |
| CE8 | 0 | 1 | 0 | 15 | 10 | 3 |
| EX8 | 1 | 0 | 0 | 8 | 20 | 6 |
| EX9 | 1 | 0 | 0 | 8 | 20 | 12 |
| CE9 | 0 | 1 | 32 | 0 | 20 | 6 |
| CE10 | 0 | 1 | 32 | 0 | 20 | 12 |
| EX10 | 1 | 0 | 16 | 0 | 10 | 6 |
| EX11 | 1 | 0 | 8 | 0 | 10 | 6 |
| EX12 | 1 | 0 | 16 | 0 | 20 | 6 |
| EX13 | 1 | 0 | 16 | 0 | 20 | 12 |
| EX14 | 1 | 0 | 8 | 0 | 20 | 6 |
| EX15 | 1 | 0 | 8 | 0 | 20 | 12 |
| EX16 | 1 | 0 | 0 | 8 | 20 | 6 |
| EX17 | 1 | 0 | 0 | 8 | 20 | 12 |
| EX18 | 1 | 0 | 0 | 15 | 10 | 6 |
| EX19 | 1 | 0 | 0 | 15 | 10 | 3 |
| CE11 | 0 | 1 | 0 | 15 | 10 | 6 |
| CE12 | 0 | 1 | 0 | 15 | 10 | 3 |

The % Extractable Silicone test was run for the EX1-4 and CE1-CB4 samples using the method described above. The results are summarized below in Table 2.

TABLE 2

| Example | Initial coating weight (gsm) | After extraction coating weight (gsm) | % Extractable silicone |
|---|---|---|---|
| EX1 | 0.309 | 0.282 | 8.6 |
| EX2 | 0.627 | 0.601 | 4.1 |
| EX3 | 1.245 | 1.137 | 8.7 |
| EX4 | 0.238 | 0.232 | 2.5 |
| CE1 | 0.318 | 0.298 | 6.2 |
| CE2 | 0.638 | 0.607 | 4.8 |
| CE3 | 1.240 | 1.197 | 3.4 |
| CE4 | 0.239 | 0.226 | 5.4 |

The water and hexadecane contact angle measurements were done for EX5-EX9 and CE5-CE8 samples using the methods described above. The results are summarized below in Table 3.

TABLE 3

| | Water Contact Angle (degrees) | | | | | | Hexadecane Contact Angles (degrees) | | | | | |
|---|---|---|---|---|---|---|---|---|---|---|---|---|
| | Advancing | | Receding | | Static | | Advancing | | Receding | | Static | |
| Example | Left | Right | Left | Right | Left | Right | Left | Right | Left | Right | Left | Right |
| CE5 | 121.2 | 121.2 | 108.0 | 108.0 | 118.4 | 118.4 | 49.0 | 49.0 | 35.2 | 35.2 | 45.0 | 45.0 |
| CE6 | 121.7 | 121.7 | 109.2 | 109.2 | 117.5 | 117.5 | 49.8 | 49.8 | 36.3 | 36.3 | 44.7 | 44.7 |
| EX5 | 122.9 | 122.9 | 100.9 | 100.9 | 118.8 | 118.8 | 47.4 | 47.4 | 33.8 | 33.8 | 43.5 | 43.5 |
| EX6 | 117.3 | 117.3 | 105.7 | 105.7 | 115.8 | 115.8 | 46.6 | 46.6 | 35.0 | 35.0 | 42.6 | 42.6 |
| EX7 | 118.4 | 118.4 | 105.0 | 105.0 | 114.2 | 114.2 | 47.7 | 47.7 | 36.1 | 36.1 | 42.0 | 42.0 |
| CE7 | 114.3 | 114.3 | 100.7 | 100.7 | 111.1 | 111.1 | 49.2 | 49.2 | 41.8 | 41.8 | 46.4 | 46.4 |
| CE8 | 114.9 | 114.9 | 99.7 | 99.7 | 110.4 | 110.4 | 50.1 | 50.1 | 42.0 | 42.0 | 47.8 | 47.8 |
| EX8 | 116.3 | 116.3 | 103.6 | 103.6 | 112.7 | 112.7 | 45.5 | 45.5 | 36.9 | 36.9 | 40.2 | 40.2 |
| EX9 | 117.2 | 117.2 | 102.8 | 102.8 | 113.2 | 113.2 | 46.0 | 46.0 | 37.6 | 37.6 | 40.5 | 40.5 |

Release testing of EX10-EX 19 and CE9-CE12 were done using the methods described above. The results are summarized below in Table 4.

TABLE 4

| Example | Coating weight (g) | Release (g/cm) | Readhesion (g/cm) | Release type |
|---|---|---|---|---|
| Control tape for CE9-CE10 | N/A | N/M | 344.17 | N/M |
| CE9 | 0.638 | 2.68 | 319.8 | Smooth |
| CE10 | 1.240 | 3.07 | 329.6 | Smooth |
| Control tape for EX10-EX11 | N/A | N/M | 341.3 | N/M |
| EX10 | 0.324 | 5.55 | 285.3 | Smooth |
| EX11 | 0.309 | 4.45 | 313.1 | Smooth |
| Control tape for EX12-EX17 | N/A | N/M | 331.3 | N/M |
| EX12 | 0.631 | 4.88 | 290.2 | Smooth |
| EX13 | 1.245 | 4.84 | 289.7 | Smooth |
| EX14 | 0.627 | 3.38 | 304.9 | Smooth |
| EX15 | 1.294 | 3.07 | 314.1 | Smooth |
| EX16 | 0.613 | 1.54 | 281.2 | Smooth |
| EX17 | 1.290 | 1.65 | 275.2 | Smooth |
| Control tape for EX18-EX19 and CE11-CE12 | N/A | N/M | 262.0 | N/M |
| EX18 | N/M | 1.30 | 143.5 | Smooth |
| EX19 | N/M | 1.42 | 168.4 | Smooth |
| CE11 | N/M | 1.46 | 187.5 | Smooth |
| CE12 | N/M | 2.01 | 207.1 | Smooth |

N/A means not applicable,
N/M means not measured.

What is claimed is:

1. A fluoroalkyl silicone of the formula:

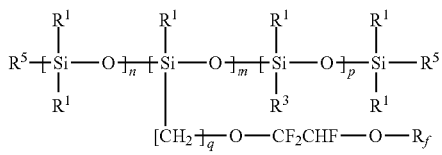

wherein
each $R^1$ is independently an alkyl or aryl;
$R_f$ is a perfluoroalkyl group, optionally substituted by one or more in-chain —O—, —S— or —$NR_f^1$— heteroatoms, where $R_f^1$ is a perfluoroalkyl, preferably a $C_1$-$C_6$ perfluoroalkyl;
$R^3$ is —H, —$OR^4$; where $R^4$ is a $C_1$-$C_4$ alkyl
n is 0 to 2000;
m may be zero;
p is at least one,
n+m+p is at least two;
q is at least 3;
$R^5$ is H, alkyl, aryl, —$(CH_2)_q$—O—$CF_2CHF$—O—$R_f$, or $R^3$;
wherein the fluoroalkyl silicone has at least two fluorinated groups of the formula —$(CH_2)_q$—O—$CF_2CHF$—O—$R_f$.

2. The fluoroalkysilane of claim 1 wherein $R_f$ is a $C_1$-$C_6$ perfluorolkyl group.

3. The fluoroalkyl silicone of claim 1, wherein $R_f$ is selected from —$CF_3$, —$CF_2CF_3$, —$C_3F_7$, —$C_4F_9$, —$C_5F_{11}$, —$C_6F_{13}$, $CF_3O(CF_2)_2CF_2$—, $(CF_3)_2N(CF_2)_2CF_2$—, —$CF_2CF(CF_3)_2$ and $C_3F_7OCF(CF_3)CF_2$—.

4. The fluoroalkyl silicone of claim 1 wherein $R_f$ is of the formula $C_rF_{2r+1}$—(O—$C_sF_{2s}$)$_t$, where r is at least 1, s is at least 2, and t is from 1 to 10.

5. The fluoroalkyl silicone of claim 4 wherein each of subscripts r and s are 3 to 6.

6. The fluoroalkyl silicone of claim 1 wherein $R_f$ is of the formula $C_rF_{2r+1}N(C_rF_{2r+1})$—$C_sF_{2s+1}$—$C_sF_{2s}$—, where r is at least 1, and s is at least 2.

7. The fluoroalkyl silicone of claim 6 wherein each of subscripts r, and s are 3 to 6.

8. The fluoroalkyl silicone of claim 1 where the ratio of m to p is from 50:50 to 20:80.

9. The fluoroalkyl silicone of claim 1 having a $M_w$ of at least 400.

10. The fluoroalkyl silicone of claim 1 wherein m is at least 2.

11. The fluoroalkyl silicone of claim 1 wherein $R^5$ is —$(CH_2)_q$—O—$CF_2CHF$—O—$R_f$ where q is at least 3 and $R_f$ is a perfluoroalkyl group, optionally substituted by one or more in-chain —O—, —S— or —$NR_f^1$— heteroatoms.

12. The fluoroalkyl silicone of claim 1 wherein p is at least 1 and $R^3$ is H.

13. The fluoroalkyl silicone of claim 1 wherein p is at least 1 and $R^3$ is —O—$R^4$, where $R^4$ is $C_1$-$C_4$ alkyl.

14. The fluoroalkyl silicone of claim 1 wherein p is 10 to 2000.

15. A method of making the fluoroalkyl silicone of claim 1, comprising
hydrosilylation of a perfluoroalkyl alkenyl ether of the formula:

$R_f$ is a perfluoroalkyl group, optionally substituted by one or more in-chain —O—, —S— or —$NR_f^1$— heteroatoms, where $R_f^1$ is a perfluoroalkyl;
and q is at least 3;

with a with a hydrosilicone of the formula:

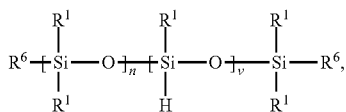

where
each $R^1$ is independently an alkyl or aryl;
n is 0 to 2000; and
v may be zero;
$R^6$ is H, alkyl, or aryl,
said hydrosilylation in the presence of a hydrosilylation catalyst;
with the proviso that the hydrosilicone contains at least two Si—H groups.

16. A release liner comprising a backing and a layer of the cured coating of the fluoroalkyl silicone of claim 1 on at least one major surface of the backing.

17. The release liner of claim 16 wherein at least one of $R^5$ and $R^3$ of the fluoroalkyl silicone is —$OR^4$, where $R^4$ is $C_1$-$C_4$ alkyl.

18. The release liner of claim 16, wherein at least one of $R^5$ and $R^3$ of the fluoroalkyl silicone is H, cured with a vinyl silicone.

19. The release liner of claim 18 wherein at least one of $R^5$ and $R^3$ of the fluoroalkyl silicone is H, and at least one of $R^5$ and $R^3$ of the fluoroalkyl silicone is —$OR^4$ and is cured by hydrosilylation with a vinyl silicone, and moisture or photo-acid cured from Si—$OR^4$.

20. An adhesive article comprising (I) a release liner comprising a backing and a cured release coating comprising the fluoroalkyl silicone of claim 1 on at least one surface of the backing, and (II) a pressure-sensitive adhesive in contact with a surface of the release liner.

21. The adhesive article according to claim 20, wherein the adhesive comprises a silicone adhesive, or an acrylate adhesive.

* * * * *

UNITED STATES PATENT AND TRADEMARK OFFICE
CERTIFICATE OF CORRECTION

PATENT NO. : 9,752,060 B2
APPLICATION NO. : 15/023737
DATED : September 5, 2017
INVENTOR(S) : Zai-Ming Qiu It is certified that error appears in the above-identified patent and that said Letters Patent is hereby corrected as shown below:

Column 1,
Line 47, delete "expensive," and insert -- expensive. --, therefor.
Line 57, delete "polyacrylate" and insert -- polyacrylates --, therefor.

Column 2,
Line 62, after "each $R^1$" insert -- is --.

Column 3,
Line 1, delete "al least" and insert -- at least --, therefor.
Line 27, delete "CHFCF$_f$—O" and insert -- CHFCF$_2$—O --, therefor.
Line 44, delete "al least" and insert -- at least --, therefor.
Line 45, delete "zero:" and insert -- zero; --, therefor.

Column 4,
Line 14, delete "Et$_3$SiOSiEtHO)$_q$SiEt$_3$" and insert -- Et$_3$SiO(SiEtHO)$_q$SiEt$_3$ --, therefor.
Lines 15 and 16, delete "dimelhylhydrosiloxysiloxanes)" and insert
-- dimethylhydrosiloxysiloxanes) --, therefor.
Line 60, delete "m the" and insert -- in the --, therefor.

Column 5,
Line 25, delete "—O—R$_f$," and insert -- —O—R$_f$; --, therefor.
Line 34, delete "OCF$_3$CHFOR$_f$" and insert -- OCF$_2$CHFOR$_f$ --, therefor.

Column 6,
Line 1, delete "halogen." and insert -- halogen, --, therefor.
Line 7, delete "(PtCl$_2$C$_3$H$_2$" and insert -- (PtCl$_2$C$_3$H$_6$)$_2$ --, therefor.
Line 12, delete "Lamorcaux);" and insert -- Lamoreaux); --, therefor.
Line 14, delete "3,313,773." and insert -- 3,313,773, --, therefor.
Lines 41 and 42, delete "($\eta^5$-cyclopentadicnyOtrialkylplatinum" and insert
-- ($\eta^5$-cyclopentadienyl)trialkylplatinum --, therefor.

Signed and Sealed this
Seventh Day of November, 2017

Joseph Matal
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 9,752,060 B2

Column 7,
Line 4, delete "pans" and insert -- parts --, therefor.
Line 40, delete "non-fluorinatcd" and insert -- non-fluorinated --, therefor.
Line 47, delete "non-fluorinatcd" and insert -- non-fluorinated --, therefor.
Line 48, delete "$R_3SiO_{1/1}$" and insert -- $R_3SiO_{1/2}$ --, therefor.
Line 64, delete "non-fluorinatcd" and insert -- non-fluorinated --, therefor.
Line 67, delete "$M^{vi}D_xM^{vi}$" and insert -- $M^{vi}D_xM^{vi}$, --, therefor.

Column 8,
Line 17, delete "-methylphcnylsiloxane" and insert -- -methylphenylsiloxane --, therefor.
Line 20, delete "$(SiMe_2O)_2(SiMe(CH_2CH_2CF_2)_m$" and insert
-- $(SiMe_2O)_n(SiMe(CH_2CH_2CF_3)O)_m$ --, therefor.
Line 24, delete "terminate" and insert -- terminated --, therefor.
Lines 31 and 32, delete "$(SiMe_3O)_n(SiMeCH=CH_3O)_mSiMe_3$" and insert
-- $(SiMe_2O)_n(SiMeCH=CH_2O)_mSiMe_2$ --, therefor.
Line 37, delete "Midland." and insert -- Midland, --, therefor.
Line 45, delete "$R^4$ where" and insert -- $R^4$, where --, therefor.
Lines 47 and 48, delete "Scheme I" and insert -- Scheme I, --, therefor.

Column 9,
Line 2, delete "2000," and insert -- 2000; --, therefor.
Line 18, delete "convened" and insert -- converted --, therefor.
Line 33, after "of" insert -- the --.

Column 10,
Lines 55 and 56, delete "commercial" and insert -- commercially --, therefor.
Line 57, delete "(Menasha. Wis.)," and insert -- (Menasha, Wis.), --, therefor.
Line 62, delete "such a" and insert -- such as --, therefor.
Line 64, delete "a" and insert -- and --, therefor.

Column 11,
Line 14, delete "optionally." and insert -- optionally, --, therefor.
Line 17, delete "2430," and insert -- 2430. --, therefor.
Line 61, delete "(meth)actylates" and insert -- (meth)acrylates --, therefor.

Column 12,
Line 34, delete "Si—OR$_4$" and insert -- Si—OR$^4$ --, therefor.
Line 43, delete "we" and insert -- are --, therefor.
Line 50, delete "knit" and insert -- knit, --, therefor.

Column 13,
Line 19, delete "1,2-dimethoxycthane" and insert -- 1,2-dimethoxyethane --, therefor.
Line 21, delete "1,2-dimethoxycthane" and insert -- 1,2-dimethoxyethane --, therefor.
Lines 22 through 27, delete ""Syl-Off 7048" is a 100 weight percent solids silane
crosslinker (said to comprise methylhydrogen cyclosiloxane, Viscosity—30 centistokes) having H—Si equivalent weight of 60, obtained from Dow Corning Corporation, Midland, Mich., under the trade designation "Syl-Off® 7048"." and insert the same as a new paragraph on Line 23.
Line 33, delete ""Q2-7785"" and insert -- "Q2-7785", --, therefor.

Column 14,
Line 13, delete "Ex tractable" and insert -- Extractable --, therefor.
Line 17, delete "Instruments." and insert -- Instruments, --, therefor.
Line 31, delete "extradables" and insert -- extractables --, therefor.

Column 16,
Line 38, delete "peal);" and insert -- peak); --, therefor.
Line 46, delete "[SiMeH—O]$_p$—," and insert -- [SiMeH—O]$_m$—[SiMe$_2$-O]$_p$-, --, therefor.

Column 17,
Line 20, delete "CH═CH$_2$" and insert -- CH═CH$_2$, --, therefor.
Line 26, delete "b.p 93-97° C." and insert -- b.p 95-97° C. --, therefor.

Column 18,
Line 47, delete "CE1-CB4" and insert -- CE1-CE4 --, therefor.

Column 20,
Line 37, in Claim 6, delete "—C$_s$F$_{2r+1}$)—C$_s$F$_{2s}$—," and insert -- —C$_s$F$_{2s}$—, --, therefor.